US012702886B2

(12) United States Patent
Lee et al.

(10) Patent No.: US 12,702,886 B2
(45) Date of Patent: Aug. 11, 2026

(54) EXERCISING BAND AND EXERCISING MONITORING SYSTEM HAVING THE SAME

(71) Applicant: Korea Institute of Machinery & Materials, Daejeon (KR)

(72) Inventors: Yongkoo Lee, Daegu (KR); Kang-Ho Lee, Daegu (KR); Hyuk Jin Lee, Gyeongsan-si (KR); Yoo Na Kang, Daegu (KR)

(73) Assignee: Korea Institute of Machinery & Materials, Daejeon (KR)

( * ) Notice: Subject to any disclaimer, the term of this patent is extended or adjusted under 35 U.S.C. 154(b) by 334 days.

(21) Appl. No.: 17/842,948

(22) Filed: Jun. 17, 2022

(65) Prior Publication Data

US 2022/0409943 A1 Dec. 29, 2022

(30) Foreign Application Priority Data

Jun. 29, 2021 (KR) ........................ 10-2021-0084741

(51) Int. Cl.
*A63B 21/00* (2006.01)
*A63B 21/055* (2006.01)
(Continued)

(52) U.S. Cl.
CPC .... *A63B 21/00185* (2013.01); *A63B 21/0552* (2013.01); *A63B 21/068* (2013.01);
(Continued)

(58) Field of Classification Search
CPC .......... A63B 21/00185; A63B 21/0552; A63B 21/068; A63B 24/0062; A63B 2024/0071; A63B 2220/833; A63B 2220/13; A63B 2220/51; A63B 21/02; A63B 21/021; A63B 21/022; A63B 21/023; A63B 21/025;
(Continued)

(56) References Cited

U.S. PATENT DOCUMENTS

2016/0305759 A1* 10/2016 Reese ...................... G01B 7/22
2019/0269967 A1* 9/2019 Thomas ........... A63B 21/00185
(Continued)

FOREIGN PATENT DOCUMENTS

DE 102016003697 A1 * 9/2017 ......... A63B 71/0622
KR 20130081763 A * 7/2013 ............. A63B 71/12
KR 101326796 B1 11/2013

*Primary Examiner* — Loan B Jimenez
*Assistant Examiner* — Jacqueline N L Loberiza
(74) *Attorney, Agent, or Firm* — Harness, Dickey & Pierce, P.L.C.

(57) ABSTRACT

In an exercising band and an exercising monitoring system having the exercising band, the exercising band includes a band part, at least one sensor part and a spacer. The band part is configured to be elongated according as an external force is applied. The sensor part is disposed inside of the band part, is configured to be elongated according as the band part is elongated, and has first and second sensors. The first and second sensors have conductivity. The spacer is configured to insulate the first and second sensors with each other. The first and second sensors are electrically contacted with each other, as the external force is applied along a direction substantially crossing an extending direction of the first and second sensors.

10 Claims, 8 Drawing Sheets

(51) Int. Cl.
*A63B 21/068* (2006.01)
*A63B 24/00* (2006.01)
*G01L 5/101* (2020.01)

(52) U.S. Cl.
CPC .......... *A63B 24/0062* (2013.01); *G01L 5/101* (2013.01); *A63B 2024/0071* (2013.01); *A63B 2220/833* (2013.01)

(58) Field of Classification Search
CPC ... A63B 21/026; A63B 21/027; A63B 21/028; A63B 21/055; A63B 21/0555; A63B 21/0557; G01L 5/101
See application file for complete search history.

(56) References Cited

U.S. PATENT DOCUMENTS

2020/0289890 A1 9/2020 Kim et al.
2021/0086031 A1 3/2021 Thomas

* cited by examiner 10
100
300
200
220
210
A
B
C
D
F
F

EXERCISING BAND AND EXERCISING MONITORING SYSTEM HAVING THE SAME

This application claims priority under 35 U.S.C. § 119 to Korean Patent Application No. 10-2021-0084741, filed on Jun. 29, 2021, the disclosure of which is incorporated by reference herein in its entirety.

BACKGROUND

1. Field of Disclosure

The present disclosure of invention relates to an exercising band and an exercising monitoring system having the exercising band, and more specifically the present disclosure of invention relates to an exercising band and an exercising monitoring system having the exercising band, capable of monitoring an exercise state such as a position or a direction of a muscular strength, a magnitude of an applied muscular strength and so on in a real-time, in cases that a strength training is performed using a band.

2. Description of Related Technology

Recently, various exercise methods are being developed to perform strength exercises using simple tools such as exercise bands, and the effect of the exercise is high and the use is high in various age groups.

For example, Rodney Harold Thomas (US 2021-0086031) discloses the technology of monitoring an exercise state, in cases that the user holds both sides of an exercise band while fixing a center of the exercise band with his feet and performing physical exercises such as arms. Here, a plurality of force sensors is fixed to the exercise band and the force applied to the exercise band in cases that the user pulls the band with his arms, so that, especially, the magnitude of the muscular strength is measured during the exercise.

Further, as disclosed by Rodney Harold Thomas, most of the technologies for monitoring the user's exercise state in the exercise band developed so far are only at the level of directly sensing the force applied to the band by installing the force sensor or the like.

However, when the force sensor is installed to the band, performing exercises using various postures with the band may be restricted and cost prices for manufacturing the band may be increased.

In addition, the position of the force sensor is fixed, so that the force may be measured at a specific position of the band. Thus, the strength of an actual user may be difficult to be measured accurately.

Further, the magnitude of the force applied to the band may be measured, but specific movement states such as the position fixed by the user using the feet and the changes in the movement state accordingly may be difficult to be monitored accurately.

SUMMARY

The present invention is developed to solve the above-mentioned problems of the related arts.

The present invention provides an exercising band, capable of monitoring an exercise state such as a position or a direction of a muscular strength and a change of the exercise state accordingly, a magnitude of an applied muscular strength and so on in a real-time, in cases that a strength training is performed using a band.

In addition, the present invention also provides an exercising monitoring system having the exercising band.

According to an example embodiment, exercising band includes a band part, at least one sensor part and a spacer. The band part is configured to be elongated according as an external force is applied. The sensor part is disposed inside of the band part, is configured to be elongated according as the band part is elongated, and has first and second sensors. The first and second sensors have conductivity. The spacer is configured to insulate the first and second sensors with each other. The first and second sensors are electrically contacted with each other, as the external force is applied along a direction substantially crossing an extending direction of the first and second sensors In an example, the spacer may have a mesh structure or a wire structure, to cover at least one of the first and second sensors.

In an example, the first and second sensors may extend with twisted with each other.

In an example, the first and second sensors may extend along a direction substantially same as an extending direction of the band part, and the first and second sensors may be elongated with the elongation of the band part when the external force is applied.

In an example, sensitivity of the sensor part may decrease as a thickness of the spacer increases or an opening space of the spacer narrows.

In an example, the first and second sensors may be shorted as the first and second sensors are in electrical contact with each other. A position of the electrical contact of the first and second sensors may be decided based on a voltage of both ends of the first sensor and a voltage of both ends of the second sensor.

In an example, momentum of both sides may be compared with respect to the position of the electrical contact of the first and second sensors, based on a resistance between a first end of the first sensor and a first end of the second sensor, and a resistance between a second end of the first sensor and a second end of the second sensor.

In an example, a voltage may be applied to both ends of each of the first and second sensors to obtain a resistance according to the voltage, and then increase in length of the first and second sensors according to the elongation of the band part may be obtained.

In an example, the external force applied to the band part by a user along an extending direction of the band part may be obtained, based on the increase in length of the first and second sensors.

According to another example embodiment, an exercising monitoring system includes the exercising band, first and second switches, and third and fourth switches. The first and second switches are electrically connected to both ends of the first sensor, respectively. The third and fourth switches are electrically connected to both ends of the second sensor, respectively. A power is applied to a first end of the first sensor and a second end of the second sensor, and output voltages of a second end of the first sensor and a first end of the second sensor are monitored, so that a state of an external force is monitored.

In an example, a first resistor may be connected in parallel between the first end of the second sensor and an output voltage terminal, and a second resistor may be connected in parallel between the second end of the first sensor and the output voltage terminal.

In an example, the external force applied to the band part may be monitored, when both of the first and second switches are ON and both of the third and fourth switches are OFF, or both of the first and second switches are OFF and both of the third and fourth switches are ON.

In an example, a position of the band part on which the user steps may be monitored, when both of the first and third switches are ON and both of the second and fourth switches are OFF, or both of the first and third switches are OFF and both of the second and fourth switches are ON.

According to the present example embodiments, the sensor part and the spacer are disposed inside of the exercising band for exercise, so that the external force due to the exercise being performed may be monitored, the position of the exercising band fixed by user's feet may be monitored, the exercise state of both sides with respect to the fixing position may be monitored. Then, various exercise states may be monitored accurately and effectively.

Here, the mesh structure or the wire structure is applied as the spacer insulating the sensor part and selectively contacting the sensor part, so that the spacer may be manufactured to be elastic or stretchable with the band part. In addition, the manufacturing may be more simplified and the cost prices may be decreased, and thus mass productivity may be more easily performed.

Specifically, the first and second sensors of the sensor part extends with twisted with each other, so that the electrical contact may be easily performed and the elongation may also be easily performed. Thus, the exercising band may effectively perform the function as the exercising band as well as exercising monitoring.

In addition, the sensitivity of the mesh structure may be controlled by fineness of the mesh, and the sensitivity of the wire structure may be controlled by a distance of the wire, so that the exercising band having various sensitivity may be easily manufactured.

In addition, the switches are equipped to be electrically connected to the sensor part of the exercising band. The magnitude of the external force applied to the exercising band may be monitored accurately and effectively, and the position the user stepped on and the magnitude of the external force applied to the band at both sides accordingly may also be monitored accurately and effectively, based on the ON/OFF control of the switches. Thus, exercising effect may be more increased.

REFERENCE NUMERALS

Figure 1:
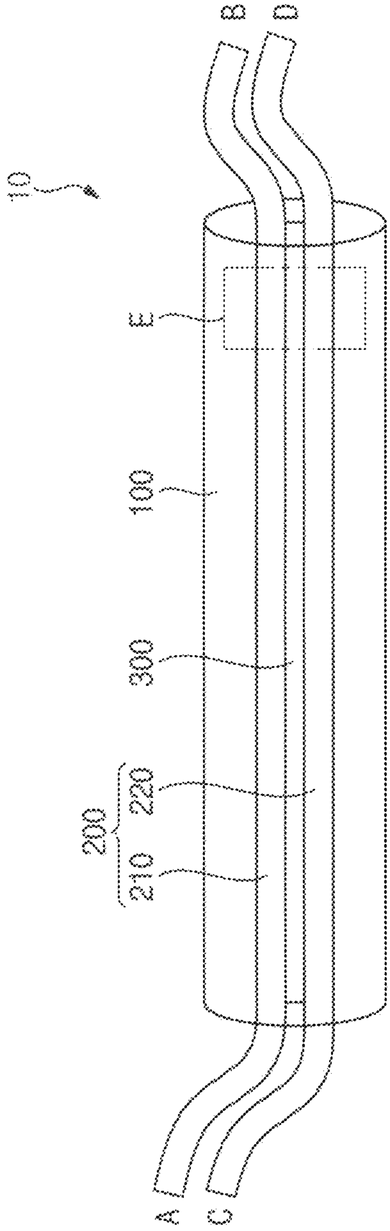
FIG. 1 is a schematic view illustrating an exercising band according to an example embodiment of the present invention.

```
10, 11, 12, 13: exercising band
20: exercising monitoring system
100: band part
200: sensor part
210: first sensor
220: second sensor
300, 301, 302: spacer
410, 420, 430, 440: switch
450, 460: resistance
```

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention is described more fully hereinafter with reference to the accompanying drawings, in which embodiments of the invention are shown.

FIG. 1 is a schematic view illustrating an exercising band according to an example embodiment of the present invention.

Generally, the exercising band 10 is used for performing various postures or motions, such as a user spreading arms with holding both sides of the exercising band 10 by hand. The exercising band 10 is manufactured by elastic or stretchable material to perform the above mentioned various postures or motions.

In addition, the user fixes the exercising band 10 with stepping on a central portion of the exercising band 10, and the user performs exercises with various postures or motions, such as spreading the arms.

The exercising band 10 according to the present example embodiment is manufactured to perform the above mentioned exercise, and as illustrated in FIG. 1, the exercising band 10 includes a band part 100, a sensor part 200 and a spacer 300.

The band part 100 forms an entire external shape of the exercising band 10, and extends along a longitudinal direction. A cross-sectional shape of the band part 100 may have a circular shape. The extending length of the band part 100 may be variously changed, and the cross-sectional shape of the band part 100 may also be changed variously.

In addition, the band part 100 includes elastic or stretchable material, for being elongated as an external force is applied.

The sensor part 200 is disposed inside of the band part 100, and the sensor part 200 extends longitudinally inside of the band part 100 as the band part 100 extends along the longitudinal direction.

Here, the sensor part 200 includes a first sensor 210 and a second sensor 220. The first sensor 210 is spaced part from the second sensor 220. The first sensor 210 has a material, a shape and a length substantially the same as the second sensor 220.

In the figure, the sensor part 200 having the first and second sensors 210 and 220 is illustrated, but alternatively, a plurality of the sensor parts 200 may be configured and here, each of the sensor parts 200 may have the first and second sensors 210 and 220. However, hereinafter, for the convenience of the explanation, single sensor part 200 having the first and second sensors 210 and 220 is explained.

Each of the first and second sensors 210 and 220 has a conductive material. Thus, when a voltage is applied to both ends of the first sensor 210 or to those of the second sensor 220, a resistance information variable according to the length of the first sensor 210 or the second sensor 220 may be obtained. In addition, based on the resistance information, an external force which is applied to the band part 100 by a user may be obtained, which will be explained below referring to FIG. 4.

The spacer 300 is disposed between the first sensor 210 and the second sensor 220, and at an initial state, the distance between the first and second sensors 210 and 220 is maintained to prevent the first and second sensors 210 and 220 from being contacted with each other.

As illustrated in FIG. 1, the spacer 300 makes the first and second sensors 210 and 220 both having the conductive material to be spaced apart from each other, and thus an electric connection between the first and second sensors 210 and 220 may be limited.

Here, the spacer 300 may be formed variously, and the examples of the spacer 300 are explained below.

Figure 2A:
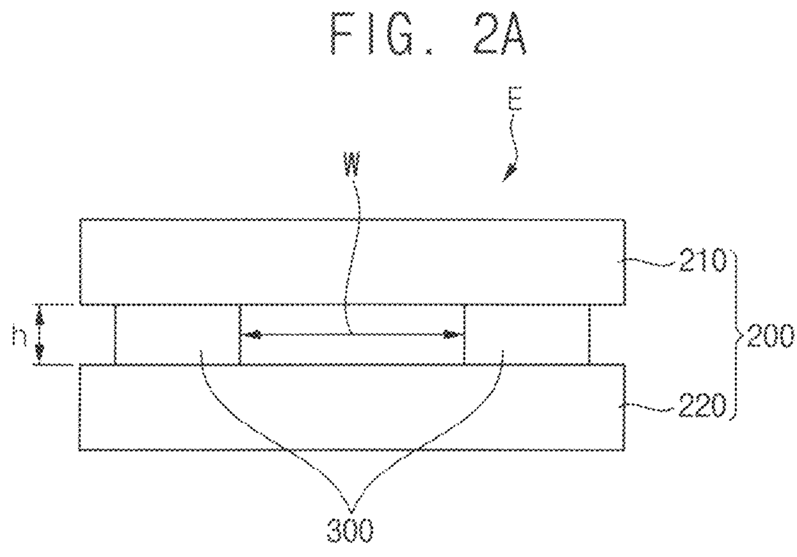
FIG. 2A is a cross-sectional view enlarging a portion 'E' of FIG. 1.
Figure 2B:
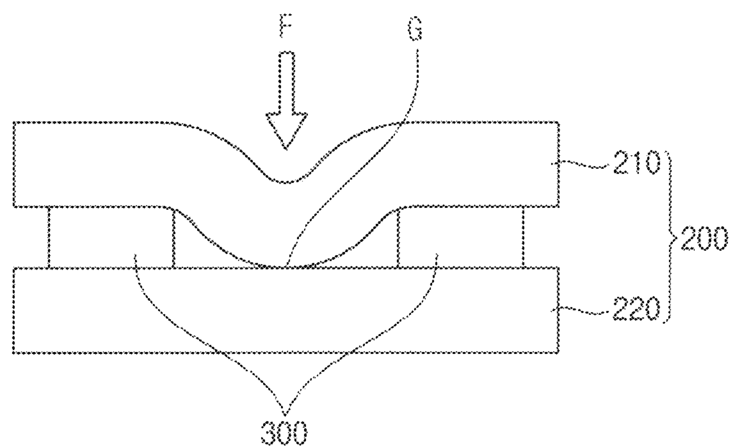
FIG. 2B is a cross-sectional view illustrating a contact state of a pair of sensors when an external force is applied.
Figure 2C:
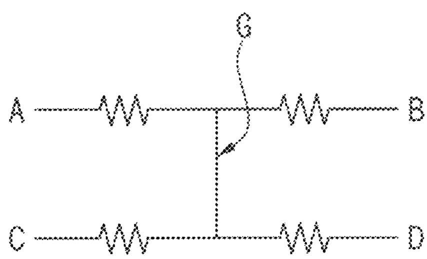
FIG. 2C is a circuit diagram illustrating the contact state of FIG. 2B.

FIG. 2A is a cross-sectional view enlarging a portion 'E' of FIG. 1, FIG. 2B is a cross-sectional view illustrating a contact state of a pair of sensors when an external force is applied, and FIG. 2C is a circuit diagram illustrating the contact state of FIG. 2B.

FIG. 2A shows an example of the limitation of the electric connection between the first and second sensors 210 and 220. Here, the spacer 300 makes the first and second sensors 210 and 220 to be spaced apart from each other, at the initial state.

Referring to FIG. 2A, the spacer 300 maintains a distance h between the first and second sensors 210 and 220, uniformly. For example, when each of the first and second sensors 210 and 220 has a predetermined area, a pair of spacers 300 having a distance of w may make the first and second sensors 210 and 220 to be spaced apart from each other, uniformly.

When the user exercises with the exercising band 10 of the present example embodiment, the user may use his foot or other body part to step on or immobilize a specific portion of the exercising band 10. Here, when the external force F is applied to the specific portion of the exercising band 10 along a direction crossing the extending direction of the exercising band 10, the first and second sensors 210 and 220 make contact with each other at the specific portion of the exercising band 10.

The spacer 300 maintains the distance between the first and second sensors 210 and 220, for the insulation, but as the external force F is applied, the first and second sensors 210 and 220 make contact with each other and are electrified at a contact portion G.

FIG. 2C shows the circuit diagram illustrating the electrified state between the first and second sensors 210 and 220 at the contact portion G.

Referring to FIG. 2C, both ends of the first sensor 210 are defined as A and B, and both ends of the second sensor 220 are defined as C and D, and then as the first and second sensors 210 and 220 make contact with each other at the contact portion G, the contact portion G is electrically connected without any resistance and the circuit may be modeled as a bridge circuit in a whole.

Thus, from the bridge circuit of FIG. 2C, based on the resistance change information between A and C, the resistance change information between B and D, in addition to the resistance change information between A and B, the resistance change information between C and D, the contact portion G at which the sensors are contacted with each other may be obtained. Further, the external force applied to each side with respect to the contact portion G may also be obtained. In this regard, more detailed explanation will be followed in an exercising monitoring system.

As explained above, the spacer 300 may have a bar shape or a plate shape extending along a direction, but not limited thereto. Thus, hereinafter, the examples of the spacer 300 will be explained.

Figure 3A:
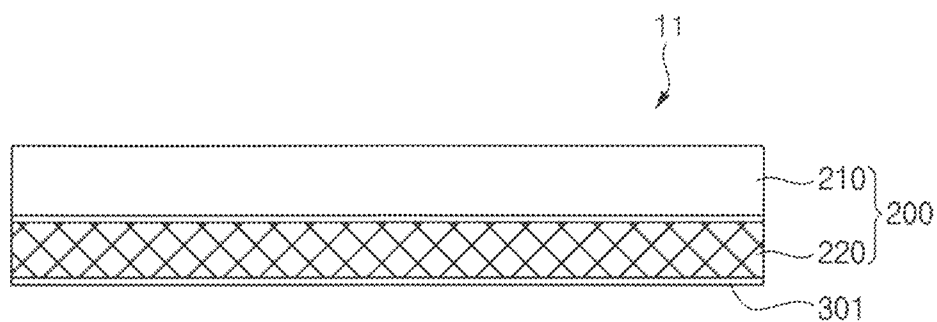
FIG. 3A is a schematic view illustrating an example of a sensor part and a spacer in the exercising band.
Figure 3B:
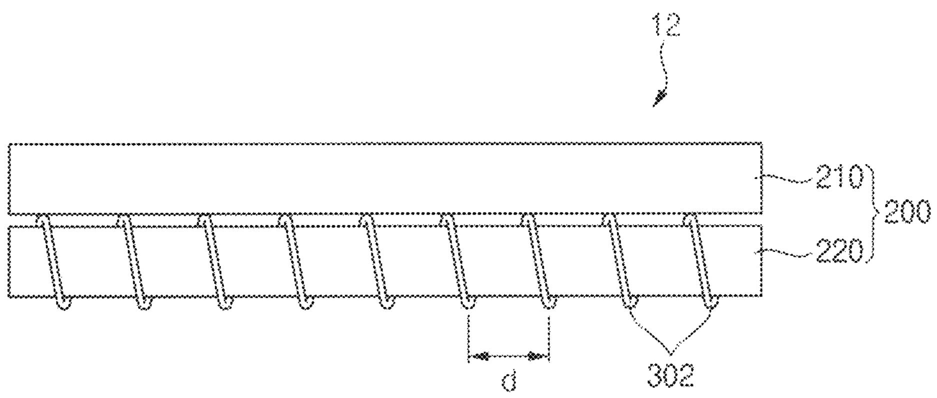
FIG. 3B is a schematic view illustrating another example of a sensor part and a space.
Figure 3C:
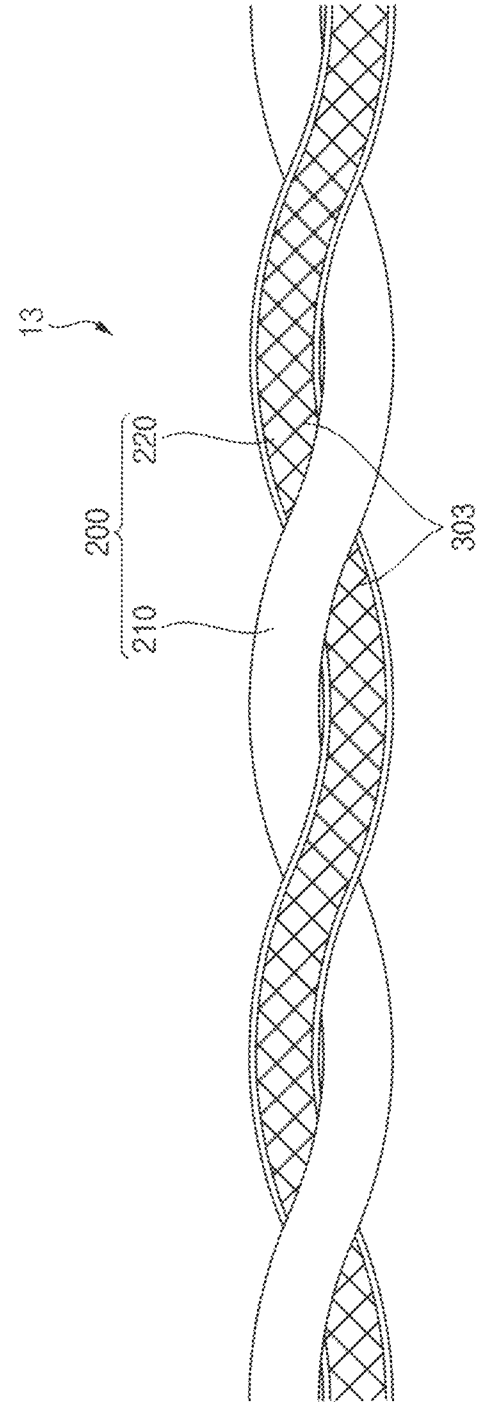
FIG. 3C is a schematic view illustrating still another example of a sensor part and a spacer.

FIG. 3A is a schematic view illustrating an example of a sensor part and a spacer in the exercising band, FIG. 3B is a schematic view illustrating another example of a sensor part and a space, and FIG. 3C is a schematic view illustrating still another example of a sensor part and a spacer.

Referring to FIG. 3A, in the exercising band 11, the spacer 301 has a mesh structure, to cover an outer surface of the second sensor 220.

Here, as illustrated, the mesh structure has a structure woven to form mesh-shaped openings. A stretchable and non-conductive material having the mesh structure is formed to cover the second sensor 220.

Here, the mesh structure may also cover the first sensor 210, and alternatively, the mesh structure may cover both of the first and second sensors 210 and 220.

Accordingly, as the mesh structure covers at least one sensor and the pair of sensors extends inside of the band part 100, the first and second sensors 210 and 220 are spaced apart from each other and are insulated from each other when the external force is not applied. However, as the external force is applied, the first and second sensors 210 and 220 make contact with each other through the openings of the mesh structure and thus the first and second sensors 210 and 220 are electrified.

Alternatively, referring to FIG. 3B, in the exercising band 12, the spacer 302 has a wire structure, to be wound on an outer surface of the second sensor 220.

Here, the wire 302 has a predetermined diameter, and is wound on the outer surface of the second sensor 220, like a coil shape as illustrated in FIG. 3B. A wound distance d of the wire is maintained properly, and thus the first and second sensors 210 and 220 may be spaced apart by a predetermined distance.

Here, the wire 302 may cover the first sensor 210, and alternatively, the wire 302 may also cover both of the first and second sensors 210 and 220, like the mesh structure 301.

Accordingly, as the wire structure covers at least one sensor and the pair of sensors extends inside of the band part 100, the first and second sensors 210 and 220 are spaced apart from each other and are insulated from each other when the external force is not applied. However, as the external force is applied, the first and second sensors 210 and 220 make contact with each other through the space of the wound distance d of the wire and thus the first and second sensors 210 and 220 are electrified.

Further, referring to FIG. 3C, with the mesh structure 303 covering the outer surface of the first sensor 210 or the second sensor 220, the first and second sensors 210 and 220 extend along a direction with a twisted shape.

Here, the mesh structure 303 may be substantially same as the mesh structure 301 in FIG. 3A. Alternatively, instead of the mesh structure 303, the wire structure 302 in FIG. 3B may be applied.

Accordingly, as the pair of sensors 210 and 220 extends with the twisted shape, the distance between the sensors 210 and 220 becomes closer, and more uniform contact may be induced at all portions of the sensors 210 and 220 extending along the longitudinal direction when the external force is applied.

Further, as the external force is applied, the first and second sensors 210 and 220 are stretched with the band part 100. But, as the external force is applied repeatedly, the first and second sensors 210 and 220 may be cut off due to reduced durability. Thus, since the first and second sensors 210 and 220 extends with the twisted shape, the durability for the external force may be increased and the exercising monitoring may be performed more stably.

In FIG. 3C, the pair of first and second sensors 210 and 220 are twisted with each other, but an additional structure or wire having the same cross-sectional shape with each of the first and second sensors 210 and 220 may be added and then two sensors 210 and 220 and the additional structure or wire are extended with a twisted shape.

Generally, compared to the two twisted wires, three wires extending with the twisted shape have more stable and durable extending state. Thus, the additional structure which is not a conductor is added to the twisted shape of the first and second sensors 210 and 220, so that the extended structure of three wires may have more increased stability and durability.

Figure 4:
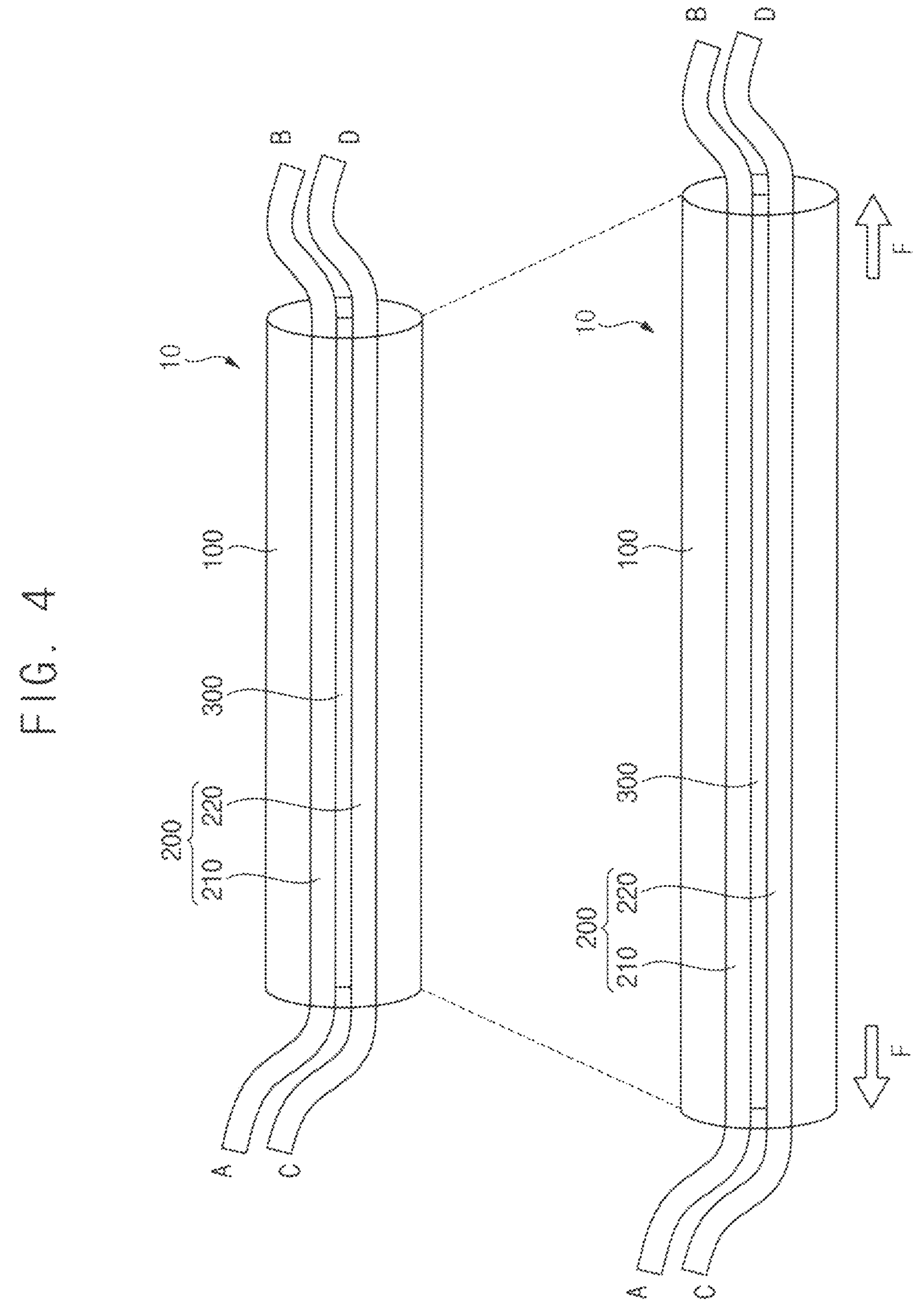
FIG. 4 is a schematic view illustrating a deformed state of the exercising band of FIG. 1, when the force is applied to both ends of the exercising band.

FIG. 4 is a schematic view illustrating a deformed state of the exercising band of FIG. 1, when the force is applied to both ends of the exercising band.

As explained above, when the voltage is applied to both ends of each of the first and second sensors 210 and 220, a resistance information variable according to the length of the first sensor 210 or the second sensor 220 may be obtained. In addition, based on the resistance information, the external force which is applied to the band part 100 by a user may be obtained.

Referring to FIG. 4, the band part 100 is elongated due to the external force F applied along the extending direction of the band part 100, with the first sensor 210, the spacer 300 and the second sensor 220. Alternatively, when the external force F is not applied, the band part 100 decreases in length with the first sensor 210, the spacer 300 and the second sensor 220.

Accordingly, as the length of the first sensor 210 or the second sensor 220 increases, the resistance increases relatively, and as the length thereof decreases, the resistance decreases relatively. Thus, based on the resistance information according the applied voltage, the information whether the first sensor 210 or the second sensor 220 increases or decreases in length may be obtained.

When the first sensor 210 or the second sensor 220 increases in length, the user applies the external force to the band part 100 and then the length of the band part 100 increases. Thus, based on the resistance information obtained by the first sensor 210 or the second sensor 220, the external force F applied by the user may be obtained.

Accordingly, in the present example embodiment, the external force F applied to the band part 100 by the user is easily obtained by merely applying the voltage to both ends of the first sensor 210 or the second sensor 220 and obtaining the resistance information.

Figure 5A:
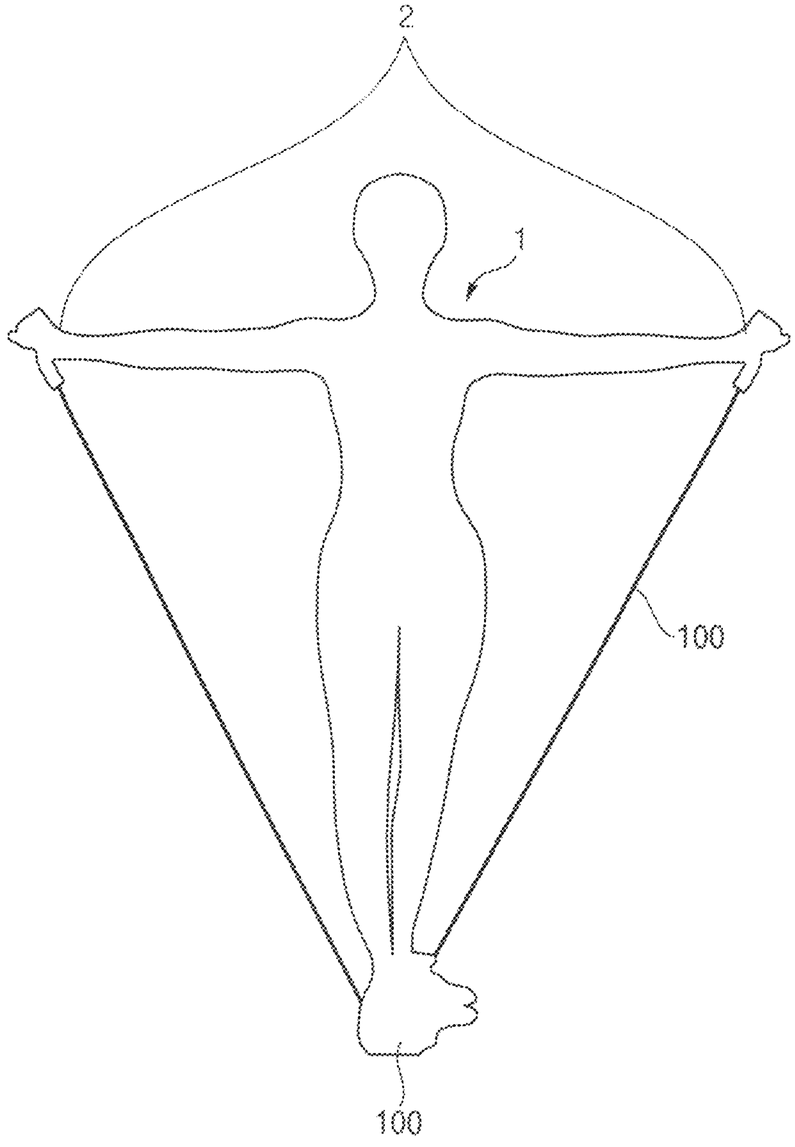
FIG. 5A is an image showing an exercise state using the exercising band of FIG. 1.
Figure 5B:
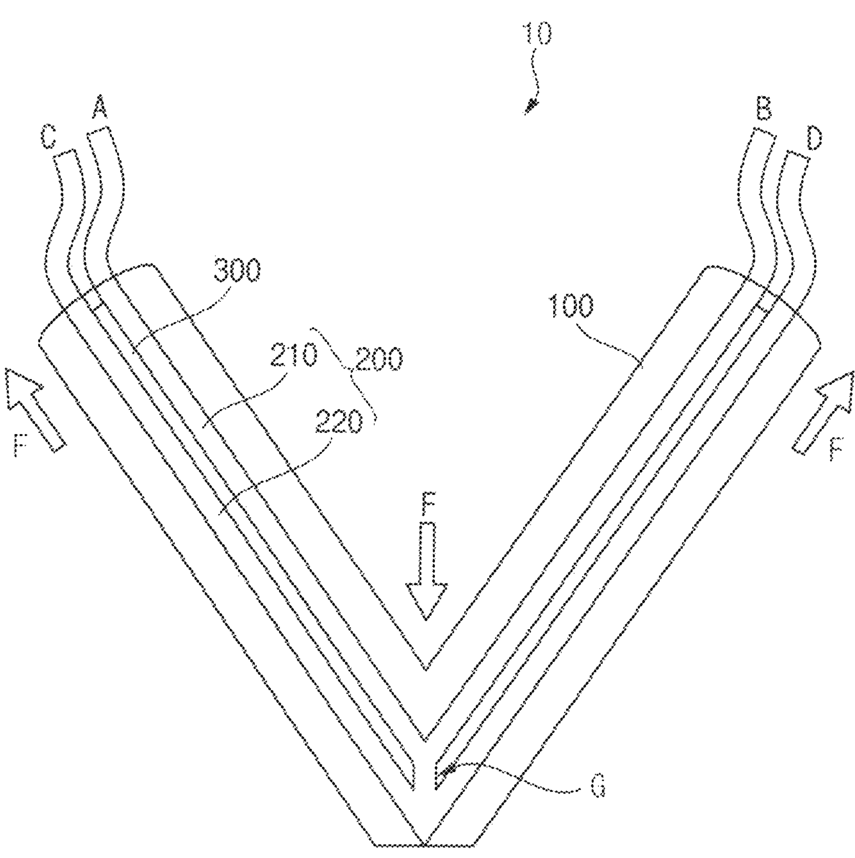
FIG. 5B is a schematic view illustrating the state of the exercising band of FIG. 1, in the exercise sate of FIG. 5A.

FIG. 5A is an image showing an exercise state using the exercising band of FIG. 1, and FIG. 5B is a schematic view illustrating the state of the exercising band of FIG. 1, in the exercise sate of FIG. 5A.

Referring to FIG. 5A, as explained above, for the exercising band 10 according to the present example embodiment, the user 1 steps on a central portion of the band 10 using feet 3 and performs an exercise using both arms 2.

In the above exercising state, the state of the exercising band 10 is illustrated in FIG. 5B.

Referring to FIG. 5B, the first and second sensors 210 and 220 are connected and electrified at the contact portion G which is a fixed portion, and the first and second sensors 210 and 220 are insulated with each other by the spacer 300 in other area or portion of the band 10.

Thus, when the exercise using both arms is performed with fixing the specific portion of the exercising band 10, the external force from each arm should be monitored separately or the position of the fixing portion should be monitored.

Thus, the exercising monitoring system having the exercising band 10 is explained below regarding the above monitoring.

Figure 6:
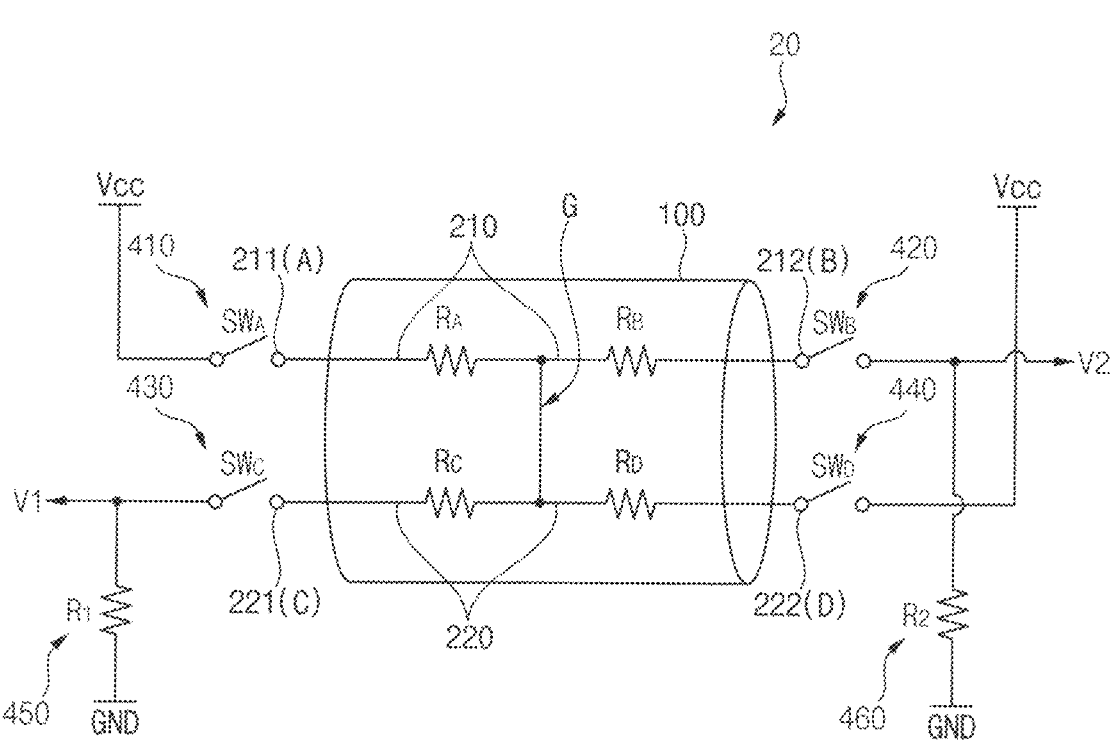
FIG. 6 is a circuit diagram illustrating an exercising monitoring system having the exercising band of FIG. 1.

FIG. 6 is a circuit diagram illustrating an exercising monitoring system having the exercising band of FIG. 1.

Referring to FIG. 6, the exercising monitoring system 20 has a switching circuit in addition to the exercising band 10 explained above referring to FIG. 1 to FIG. 5B, and is the monitoring system for monitoring the exercising state explained above in FIG. 5B. Thus, as illustrated in FIG. 6, the circuit diagram having the switching circuit is illustrated as the exercising monitoring system 20.

Referring to FIG. 6, the first sensor 210 and the second sensor 220 inside of the band part 100 is electrically connected at the contact portion G, and the circuit may be configured in a form of the bridge circuit in a whole. In addition, the resistance generated in the first sensor 210 is separated into $R_A$ and $R_B$ with respect to the contact portion G, and the resistance generated in the second sensor 220 is separated into $R_C$ and $R_D$ with respect to the contact portion G.

In addition, the exercising monitoring system 20 includes the switching circuit, and thus the information of the position of the contact portion G, and the information of the external force applied to each part of the band part 100 with respect to the contact portion G.

In the exercising monitoring system 20, a first switch ($SW_A$) 410 is connected between a first end (A) 211 of the first sensor 210 and a common power (Vcc), and a second switch ($SW_B$) 420 is connected between a second end (B) 212 of the first sensor 210 and a terminal of a second output power (V2).

Here, a second resistor (R2) is connected between the second switch ($SW_B$) 420 and the terminal of the second output power (V2), and the second resistor (R2) is grounded (GND).

In addition, a third switch ($SW_C$) 430 is connected between a first end (C) 221 of the second sensor 220 and a terminal of a first output power (V1), and a fourth switch ($SW_D$) 440 is connected between a second end (D) 222 of the second sensor 220 and the common power (Vcc).

Here, a first resistor (R1) is connected between the third switch ($SW_C$) 430 and the terminal of the first output power (V1), and the first resistor (R1) is grounded (GND).

Accordingly, in the exercising monitoring system 20, a magnitude of the output power V1 and V2 with respect to the common power (Vcc) inputted to the first sensor 210 or the second sensor 220 is obtained, to monitor various exercising states.

For example, when the first switch ($SW_A$) and the second switch ($SW_B$) are in an ON state and the third switch ($SW_C$) and the fourth switch ($SW_D$) are in an OFF state, the second output power (V2) is defined as Formula 1 below.

$$V_2 = \frac{R_2}{(R_A + R_B) + R_2} \times V_{cc} \qquad \text{[Formula 1]}$$

Thus, from Formula 1, the external force applied to the first sensor 210, which is the force applied along the extending direction of the band part 100 is obtained.

Here, the increase of the resistance may be obtained, by comparing the initial value (V2) of Formula 1 before applying the external force to the value (V2) after applying the external force. Thus, the change of the first sensor 210 and the external force accordingly may be obtained.

Likewise, when the first switch ($SW_A$) and the second switch ($SW_B$) are in an OFF state and the third switch ($SW_C$) and the fourth switch ($SW_D$) are in an ON state, the first output power (V1) is defined as Formula 2 below.

$$V_1 = \frac{R_1}{(R_C + R_D) + R_1} \times V_{cc} \qquad \text{[Formula 2]}$$

Thus, from Formula 2, the external force applied to the second sensor 220, which is the force applied along the extending direction of the band part 100 is obtained, as mentioned above.

Further, when the first switch ($SW_A$) and the third switch ($SW_C$) are in an ON state and the second switch ($SW_B$) and the fourth switch ($SW_D$) are in an OFF state, the first output power (V1) is defined as Formula 3 below.

$$V_1 = \frac{R_1}{(R_A + R_C) + R_1} \times V_{cc} \qquad \text{[Formula 3]}$$

Likewise, when the first switch ($SW_A$) and the third switch ($SW_C$) are in an OFF state and the second switch ($SW_B$) and the fourth switch ($SW_D$) are in an ON state, the second output power (V2) is defined as Formula 4 below.

$$V_2 = \frac{R_2}{(R_B + R_D) + R_2} \times V_{cc} \qquad \text{[Formula 4]}$$

Accordingly, the position of the contact portion G is obtained, by comparing the first output power (V1) to the second output power (V2) obtained from Formula 3 and Formula 4.

Since the material and the shape of the first and second sensors 210 and 220 are same, $R_A=R_C$ and $R_B=R_D$. The magnitude of the common power (Vcc) is assumed to be same and the magnitude of the first and second resistors (R1) and (R2) is also assumed to be same, and then the position information on which side the contact portion G is located may be obtained easily, by comparing the magnitude of the first output power (V1) and the second output power (V2) from Formula 3 and Formula 4.

In addition, after obtaining the position of the contact portion G, the external force applied to a left side of the contact portion G at which the first and third switches ($SW_A$ and $SW_C$) are located by the user may be obtained from Formula 3. Likewise, the external force applied to a right side of the contact portion G at which the second and fourth switches ($SW_B$ and $SW_D$) are located by the user may be obtained from Formula 4.

According to the present example embodiments, the sensor part and the spacer are disposed inside of the exercising band for exercise, so that the external force due to the exercise being performed may be monitored, the position of the exercising band fixed by user's feet may be monitored, the exercise state of both sides with respect to the fixing position may be monitored. Then, various exercise states may be monitored accurately and effectively.

Here, the mesh structure or the wire structure is applied as the spacer insulating the sensor part and selectively contacting the sensor part, so that the spacer may be manufactured to be elastic or stretchable with the band part. In addition, the manufacturing may be more simplified and the cost prices may be decreased, and thus mass productivity may be more easily performed.

Specifically, the first and second sensors of the sensor part extends with twisted with each other, so that the electrical contact may be easily performed and the elongation may also be easily performed. Thus, the exercising band may effectively perform the function as the exercising band as well as exercising monitoring.

In addition, the sensitivity of the mesh structure may be controlled by fineness of the mesh, and the sensitivity of the wire structure may be controlled by a distance of the wire, so that the exercising band having various sensitivity may be easily manufactured.

In addition, the switches are equipped to be electrically connected to the sensor part of the exercising band. The magnitude of the external force applied to the exercising band may be monitored accurately and effectively, and the position the user stepped on and the magnitude of the external force applied to the band at both sides accordingly may also be monitored accurately and effectively, based on the ON/OFF control of the switches. Thus, exercising effect may be more increased.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An exercising band comprising:

a band part configured to be elongated according as an external force is applied; at least one sensor part being inside the band part, the at least one sensor part having a first sensor and a second sensor, the first and second sensors along a direction substantially same as an extension direction of the band part and being parallel to each other, the first and second sensors each having conductivity; and a spacer being between the first and second sensors to make a distance therebetween and configured to insulate the first and second sensors from each other, wherein when the external force is applied, the first and second sensors are configured to be elongated as the band part is elongated, and wherein the external force applied to the band part is obtained based on an increase in length of the first and second sensors, wherein the first and second sensors are shorted as the first and second sensors are in electrical contact with each other, and wherein a position of the electrical contact of the first and second sensors is decided based on a voltage of both ends of the first sensor and a voltage of both ends of the second sensor.

2. The exercising band of claim 1, wherein the spacer has a mesh structure or a wire structure, and is configured to cover at least one of the first and second sensors.

3. The exercising band of claim 2, wherein sensitivity of the at least one sensor part decreases as a thickness of the spacer increases or an opening space of the spacer narrows.

4. The exercising band of claim 1, wherein momentum of both sides is compared with respect to the position of the electrical contact of the first and second sensors, based on a resistance between a first end of the first sensor and a first end of the second sensor, and a resistance between a second end of the first sensor and a second end of the second sensor.

5. The exercising band of claim 1, wherein a voltage is applied to both ends of each of the first and second sensors to obtain a resistance according to the voltage, and then the increase in length of the first and second sensors according to the elongation of the band part is obtained.

6. The exercising band of claim 5, wherein the external force applied to the band part by a user along the extension direction of the band part is obtained, based on the increase in length of the first and second sensors.

7. An exercising monitoring system comprising:

the exercising band as claimed in claim 1;

first and second switches electrically connected to both ends of the first sensor, respectively; and third and fourth switches electrically connected to both ends of the second sensor, respectively, wherein a power is applied to a first end of the first sensor and a second end of the second sensor, and output voltages of a second end of the first sensor and a first end of the second sensor are monitored, so that a state of an external force is monitored.

8. The exercising monitoring system of claim 7, wherein a first resistor is connected in parallel between the first end of the second sensor and an output voltage terminal, and a second resistor is connected in parallel between the second end of the first sensor and the output voltage terminal.

9. The exercising monitoring system of claim 7, wherein the external force applied to the band part is monitored, when both of the first and second switches are ON and both of the third and fourth switches are OFF, or both of the first and second switches are OFF and both of the third and fourth switches are ON.

10. The exercising monitoring system of claim 7, wherein a position of the band part on which a user steps is monitored, when both of the first and third switches are ON and both of the second and fourth switches are OFF, or both of the first and third switches are OFF and both of the second and fourth switches are ON.

* * * * *